United States Patent Office 3,367,785
Patented Feb. 6, 1968

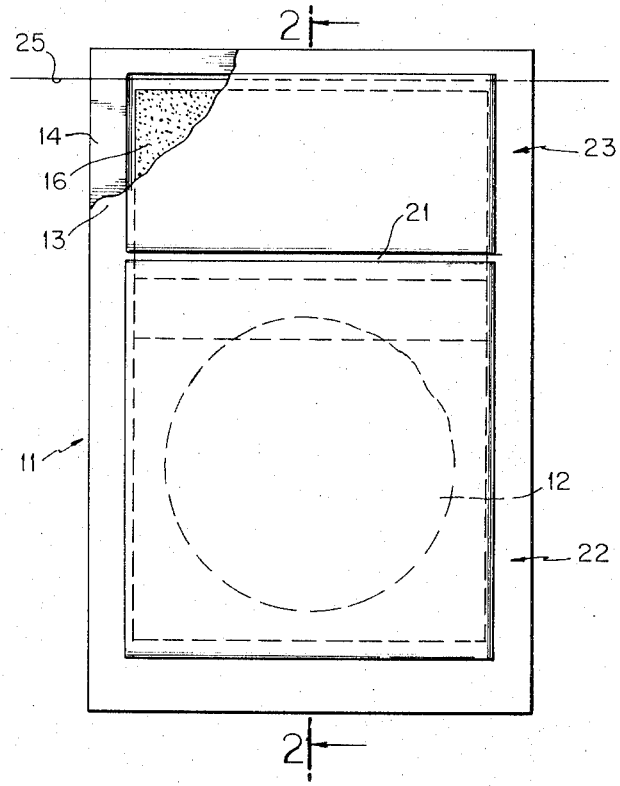
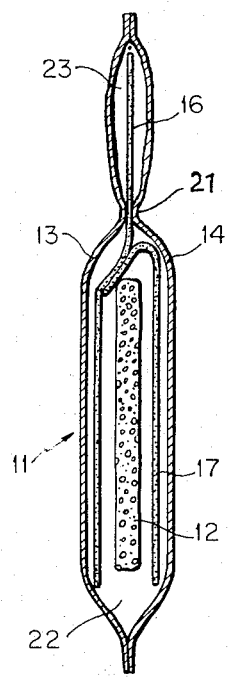

3,367,785
PACKAGE AND METHOD FOR HYDRATING A HYDRATABLE PRODUCT
Thomas P. Finucane, Hartsdale, Milton Kaplow, Elmsford, and Joseph M. Rispoli, Brooklyn, N.Y., assignors to General Food Corporation, White Plains, N.Y., a corporation of Delaware
Filed Sept. 30, 1964, Ser. No. 400,505
6 Claims. (Cl. 99—171)

ABSTRACT OF THE DISCLOSURE

A package comprising an envelope of air- and water-impervious sheet material and sealed around its outer edges is provided with an intermediate seal dividing the package into a lower, product-containing compartment and an upper, water-receiving compartment. A continuous wicking means extends from the upper compartment through said intermediate seal and envelops a hydratable product in said lower compartment. The intermediate seal is of such firmness as to prevent free flow of water therethrough but to permit passage of water past said seal through the capillaries of said wicking means so that when said upper compartment is opened and water is introduced therein, the water will progress through said wicking means to effect a slow rehydration of a hydratable product contained in said lower compartment.

Background of the invention

This invention relates generally to packaging adapted for containing and storing a hydratable product, the invention relating more particularly to a packaging means and a method whereby the product may be hydrated to its desired moisture content without removable thereof from the package in which it is contained and stored.

The invention is disclosed herein in conjunction with a dried food product, specifically, a slice of bread, but it should be understood that the invention has applicability to a wide range of dried or hydratable products other than baked foodstuffs, such as bread or the like, disclosed herein by way of example. In the case of bread or baked breadlike substances, a problem has always existed in transporting and handling large quantities thereof due to the relatively large bulk of the product in its natural state. Also, the perishable nature of bread and breadlike substances has given rise to storage problems under circumstances where it is desired to store such products for an extended period of time. The present invention is directed to a means and method for solving both of these problems by enabling bread, breadlike, or a similar product to be considerably reduced in bulk for ease in handling and storage, and in so doing, increasing its storage stability, the invention relating particularly to the means and method for achieving stable storage over extended periods of time and for restoring the product to its original bulk and moisture content with its taste and textural qualities substantially unimpaired when ready for use.

In accordance with the invention, the product after first having been dried and, in the case of bread, compressed to a considerable extent relative to its original or normal moisture content and bulk is packaged in an air and moisture-impervious container, the product being wrapped within a wicking means, such as filter paper or the like, which substantially lines the interior surfaces of said container.

The package is preferably formed of flexible packaging material and sealed under vacuum, the packaging material being any which provides a good air and moisture barrier over extended periods of time, one such suitable material being a cellophane/foil/polyethylene laminate. In addition to the edge seal extending around the borders of the package, there is also provided an intermediate seal which in effect divides the package into a product containing section or compartment and an upper water receiving section or compartment. The intermediate seal is preferably a heat seal achieved through the medium of a thermoplastic coating on the interior surfaces of the packaging material, said heat seal being effected by the bonding of opposed interior surfaces of the packaging material with the aforesaid wicking means, i.e., filter paper or the like, which is disposed so as to extend from the product containing compartment into the water receiving compartment of the package. A suitable opening means such as a tear string or the like disposed across the upper edge of the package serves, when actuated, to sever the packaging material at the upper limit of the water receiving section when it is desired to hydrate or restore the product to its original bulk and moisture content preparatory for use.

It has been found that the hydration or restoration of products such as those herein referred to is best accomplished by slow application of moisture thereto by wicking means or the like, as opposed to direct application of water thereto. The intermediate seal which separates the package into two compartments, as aforesaid, is of sufficient strength to prevent direct flow of water from the water receiving compartment into the product containing section or compartment but is not of such strength or firmness as to prevent water from progressing from the water receiving section into the product containing section through the wicking means embedded within said intermediate seal.

The dimensions of the product containing section of the package are such as to conveniently accommodate the product thus packaged, while the dimensions of the water receiving section are such as to constitute a vessel of proper capacity for holding an amount of water preferably just sufficient to hydrate the contained product to its original or desired moisture content.

Accordingly, it will be seen that the package provides a unique and simplified means for achieving the hydration of the contained product which may be accomplished by actuating the tear string opener to expose the water receiving compartment thereof, filling said compartment with water, and then allowing the water to wick through from said compartment onto the product in the product containing section or compartment before fully opening the package to remove the product which is thus hydrated or restored to its original moisture content and concurrently therewith, in the case of a compressed product, expanded to its original or normal bulk. It will be apparent that the invention has utility in many and varied applications, one such application, for example, being in the packaging of field rations for military personnel. In such applications the fact that the product is handled, transported or stored in a condition affording the minimum bulk is of particularly great advantage as is also the fact that the hydration or restoring thereof may be accomplished at any location merely by the addition of water to the package and not requiring any special devices, containers or the like for achieving the hydration or restoring of the product.

It is therefore an object of this invention to improve upon the means and method for hydrating a hydratable product.

It is a further object of this invention to improve upon the means for packaging a hydratable product so as to enable the hydration thereof without removal of the product from the package.

It is a still further object of this invention to provide an improved package for a hydratable product whereby uniform hydration of the product through the medium of a wicking means may be achieved by addition of water to the package.

A still further object of the invention is to improve upon the method for storing and subsequently hydrating a hydratable product.

Further objects of the invention together with the features contributing thereto and advantages accruing therefrom will be apparent from the following description when read in conjunction with the drawing wherein:

FIG. 1 is a view in front elevation of a package adapted to contain a hydratable product.

FIG. 2 is a sectional view thereof taken along the line 2—2 of FIG. 1.

Figure 3:
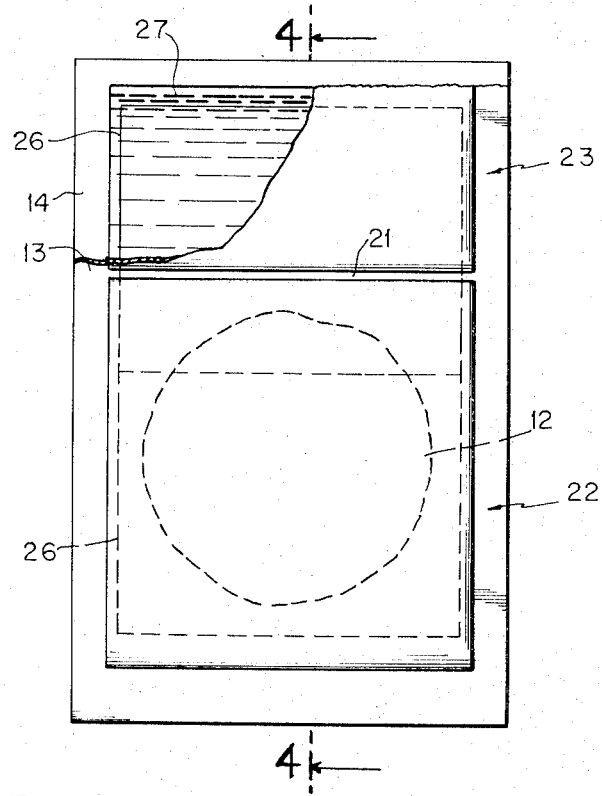
FIG. 3 is a view similar to FIG. 1 of a slightly modified package after the water receiving compartment had been opened and water introduced therein.

Referring now to the drawing, FIG. 1 illustrates in front elevation a package fabricated in accordance with the instant invention and comprising a container 11 in the form of an envelope preferably formed of flexible packaging material and enclosing a hydratable product 12 sealed within the lower one of two compartments provided by the container.

The container in the present instance comprises two sheets of preferably flexible packaging material 13, 14, impervious to air and moisture over extended periods of time and in the present instance having a substantially rectangular configuration. The inner surface of the sheet material 13, 14 is covered with a thermoplastic material such as polyethylene or the like to enable the two sheets to be bonded to each other under application of suitable heat and pressure about their border areas to provide a hermetic vacuum-proof seal for the container. Any suitable sheet material may be employed which possesses the above mentioned characteristics, one such material being a cellophane/foil/polyethylene laminate, it being understood of course that with such a material the polyethylene laminate will be disposed on the interior surface of the sheets comprising the container.

Disposed inside the container is a wicking means which may take the form of a sheet of filter paper 16 or the like, adapted to lie within the sealed border areas of the sheets 13, 14. The filter paper, or other suitable wicking means capable of causing the transmission of water through capillary attraction, occupies substantially the entire interior surface of the container so as to lie in surface contact with then entire surface area of one side of the bread slice 12 or other product, as can best be seen in FIG. 2. In the embodiment as shown in FIG. 2 an additional section of filter paper or other suitable wicking means 17 is disposed on the opposite side of the bread slice 12 so as to lie in surface contact with said opposite side, the upper edge of said additional filter paper 17 being turned under so as to maintain contact with the first mentioned sheet of filter paper 16 which extends into the upper area of the container. Thus the contained product 12 is substantially enveloped by the wicking means for achieving the wicking of water onto the opposed surfaces of the product in a manner hereinafter to be more fully described.

The sheets 13, 14, in addition to being heat-sealed together around their border areas, are also bonded to the filter paper 16 along a heat-sealed strip 21 extending across the width of the container at a position intermediate of the top and bottom border seals of the container, the intermediate seal 21 serving to separate the container into a lower product containing compartment 22 and an upper water receiving compartment 23. The intermediate heat seal 21 may comprise a surface bond with the sheet of wicking material 16, the bond between the opposed inner surfaces of the sheets 13, 14 with the wicking material being achieved as a result of the application of suitable heat and pressure to the thermoplastic coating of said sheets. The firmness of the intermediate seal 21 is controlled so as to prevent the flow of water past the seal when the water receiving compartment 23 is filled with water as will hereinafter be more fully described, but is not so firm as to prevent the passage of water past the seal by capillary attraction as provided by the fibers of the filter paper 16 or other wicking means.

The container also preferably includes an easy opening means which may take the form of a tear string 25 extending across the top portion of compartment 23 and disposed between the sheets 13, 14 as as to enable one or the other sheets to be severed along a predetermined path when the tear string is grasped and pulled to effect an opening of the container.

Sealing of the container is, especially in the case of a compressed product, preferably accomplished under a vacuum which in addition to preventing any oxidation of the product during extended storage also tends to retain the product in compressed condition under the influence of atmospheric pressure. In this connection it should be understood that the sectional views of FIGS. 2, 4 and 5 show the product containing compartment 22 of the container in a somewhat exploded manner for purposes of clarity in disclosing the construction, the water receiving compartment 23 of FIG. 2 being also similarly shown in the interest of clarity, it being understood that as a result of vacuum sealing of the container the several sheets comprising the total package will actually be tightly compressed.

Figure 4:
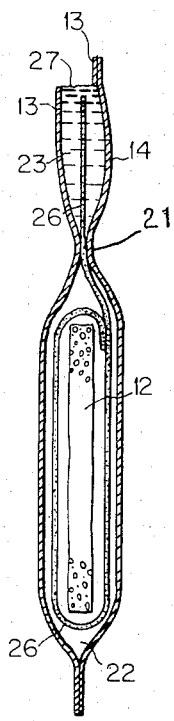
FIG. 4 is a sectional view taken along the line 4—4 of FIG. 3.

FIGS. 3 and 4 illustrate a slightly modified form of the invention which differs from that of FIGS. 1 and 2 in that the wicking means comprises a unitary sheet 26 of filter paper or the like which is wrapped around the hydratable product 12, as can best be seen in FIG. 4, to thereby envelop the product and serve the same function as the two separate sheets of filter paper 16, 17 of the first described embodiment.

From the foregoing it will be apparent that the package comprises a unique and simplified container adapted for storing a dried or hydratable product and for achieving the hydration of the product within the container to a useful or edible condition when it is desired to utilize the container contents or product. To prepare the product for use, the water receiving compartment 23 of the container is opened by pulling on the tear string 25 which severs one of the other sheets 13, 14 along the top edge of the water receiving compartment 23. The two sheets 13, 14 are then suitably separated to permit the addition of water to the water receiving chamber which has a capacity to hold at least the volume of water necessary to fully hydrate the product 12 contained in the product containing chamber 22. The container is then left in an upright position to permit the water 27 to gradually saturate the entire area of the wicking means 16, 17 or 26, and in so doing, applying water gradually to the opposed surfaces of the product 12 which is thus gradually brought to its desired moisture content.

Figure 5:
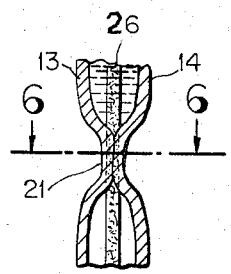
FIG. 5 is a sectional view in enlarged scale of a portion of the structure shown in FIG. 4.
Figure 6:
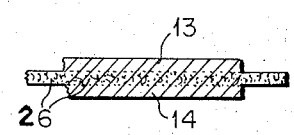
FIG. 6 is a sectional view taken along the line 6—6 FIG. 5.

FIGS. 3, 4 and 5, illustrating the container after water has been added thereto, show an optional form of the intermediate seal 21, best seen in FIGS. 5 and 6, for dividing the container into the two separate compartments 22, 23, which form may be preferred for some applications. In this form of seal the thermoplastic material is heated to such a degree as will cause it when in the plastic state to permeate the voids or interstices between the fibers of the wicking means so as to provide a direct bond between opposed surfaces of the sheets 13, 14. However, the pressure applied at the time of forming the intermediate seal 21 is not of sufficient magnitude to crush the fibers of the filter paper 16 or 25 to the point where the capillaries existing within the fibers of the wicking means are closed off or interrupted so as to prevent the progression of water from the compartment 23 into compartment 22 through the wicking means and seal 21 by capillary attraction. It should also be mentioned that in instances where the container is sealed under vacuum, the existence of any vacuum within the compartment 22 after water has been added to compartment 23 will assist the capillary attraction of the water through the seal 21 due to the force of atmospheric pressure acting on the body of water 27, the water upon progressing into the chamber 22 acting to displace the vacuum therein and thus enable the product, if packaged in a compressed state, to expand to its normal uncompressed stated, or substantially so, incident to the hydration thereof. Upon completion of the wicking process, which will be evident when the body of water 27 has been completely evacuated from the compartment 23, the lower compartment 22 of the container may then be opened to remove the product 12 which then may be put to its intended use. If desired, a suitable easy opening means, not shown, but which may take the form of a tear string such as string 25 associated with the upper compartment 23 of the container, or a tear tape comprised of the packaging material itself, or any other of many suitable easy opening devices may be provided.

The invention has been described and disclosed herein with reference to the packaging of a slice of bread in a compressed and dried state, but it should be fully understood that the concepts herein disclosed are equally applicable to many other products, not necessarily compressed, having similar characteristics and consisting essentially of protein and/or fat and/or carbohydrate and/or cellulose, or any dried or hydratable product having a cellular structure wherein hydration cannot be satisfactorily accomplished other than by a relatively slow application of water thereto such as through wicking means, as opposed to rapid rehydration techniques wherein water is applied directly such as by dipping the product into an excess of water.

While there has been shown and described what are considered to be preferred embodiments of the invention, it of course should be understood that the invention is not intended to be limited to the exact forms herein shown and described nor to anything less than the whole of the invention herein disclosed as hereinafter claimed.

What is claimed and desired to be secured by Letters Patent is:

1. A package for use with a hydratable product comprising, an envelope formed of air and moisture-impervious sheet material joined around its outer edges to provide a hermetic seal for the product contained therein, wicking means disposed within said container and arranged to substantially envelop said product, and an intermediate seal extending across opposed surfaces of said sheet material along a path serving to divide said container into two separate compartments each containing a portion of said wicking means and of which one compartment contains said product, said intermediate seal bonding said opposed surfaces to a section of said wicking means through the capillaries of which water introduced into the other of said two compartments is able to penetrate said intermediate seal and thus be wicked onto the surface of said product disposed in said one compartment of said container, said intermediate seal providing a bond of sufficient firmness to maintain a barrier against free flow of water past said seal.

2. A package adaptable for content hydration comprising, an envelope formed of air and moisture-impervious flexible sheet material joined around its outer edges to provide a hermetic seal between the interior and exterior of said envelope, an intermediate seal extending across opposed interior surfaces of said sheet material along a path serving to divide said envelope into two separate compartments, said intermediate seal providing a barrier to the free flow of water from one compartment to the other, a hydratable food product contained within the lower one of said compartments, wicking means disposed to substantially envelop said product and including a section thereof extending through said intermediate seal and into the upper one of said compartments, said wicking means providing capillaries throughout its length including the section thereof imbedded within said intermedate seal to enable water introduced into said upper compartment to progress through said intermediate seal by capillary attraction and be applied to the surface of said product by wicking action for hydrating same to a desired moisture content.

3. A method of storing and hydrating a hydratable product comprising, enveloping said product with a wicking means, enclosing said product and wicking means in a plural compartmented container so as to seal said product in one compartment thereof and to seal a portion of said wicking means in an adjacent compartment thereof, the seal separating said compartments being made of sufficient firmness to maintain a barrier against free flow of water and of insufficient firmness to substantially impede the penetration past said seal of water through the capillaries of said wicking means, opening said adjacent compartment preparatory to use of the product to render said adjacent compartment an open receptacle for holding the volume of water required to hydrate said product to a desired moisture content, and introducing said volume of water to said receptacle to cause said water to be slowly applied through said wicking means to the surface of said product for effecting the hydration thereof.

4. The invention according to claim 3 wherein the sealing of said product in said container is acomplished when the container is under vacuum.

5. A method of storing and hydrating a hydratable product comprising, enveloping said product with a wicking means, enclosing said product and wicking means in a flexible container of sheet material, sealing the edges of said container under vacuum, forming an intermediate seal across said container and through a section of said wicking means to provide a separate compartment for said product and another compartment containing a section of said wicking means, the seal separating said compartments being made of sufficient firmness to maintain a barrier against free flow of water and of insufficient firmness to substantially impede the penetration past said seal of water through the capillaries of said wicking means, opening said latter compartment preparatory to use of the product to render said compartment an open receptacle for holding the volume of water required to hydrate said product to a desired moisture content, and introducing said volume of water to said receptacle to cause said water to be slowly applied through said wicking means to the surfaces of said product for effecting the hydration thereof.

6. The invention according to claim 5 wherein the forming of said intermediate seal is achieved by a controlled application of heat and pressure sufficient to render said seal a barrier to the free flow of water but insufficient to substantially interrupt the capillaries of said section of wicking means imbedded within said intermediate seal.

References Cited
UNITED STATES PATENTS

| | | | |
|---|---|---|---|
| 2,828,858 | 4/1958 | Tooke | 206—47 |
| 2,980,540 | 4/1961 | Turpin | 99—171 X |
| 3,139,345 | 6/1964 | Nury | 99—171 |
| 3,208,640 | 9/1965 | Paulson | 99—171 X |
| 3,307,736 | 3/1967 | Kaplow | 99—171 X |

HYMAN LORD, *Primary Examiner.*